United States Patent
Moss et al.

(10) Patent No.: US 7,046,781 B1
(45) Date of Patent: May 16, 2006

(54) ADAPTIVE FEATURE BEHAVIOR

(75) Inventors: Gayle Moss, Carp (CA); Debbie Pinard, Kanata (CA)

(73) Assignee: Mitel Networks Corporation (CA)

( * ) Notice: Subject to any disclaimer, the term of this patent is extended or adjusted under 35 U.S.C. 154(b) by 0 days.

(21) Appl. No.: 09/549,013

(22) Filed: Apr. 14, 2000

(30) Foreign Application Priority Data

Apr. 14, 1999 (GB) .................................. 9908523

(51) Int. Cl.
H04M 3/42 (2006.01)
(52) U.S. Cl. ...................... 379/207.04; 379/201.01; 379/207.1
(58) Field of Classification Search ........... 379/201.12, 379/201.06, 211.02, 201.01, 207.04, 207.1
See application file for complete search history.

(56) References Cited

U.S. PATENT DOCUMENTS

| 4,166,929 | A | * | 9/1979 | Sheinbein ............... 379/209.01 |
| 5,185,782 | A | * | 2/1993 | Srinivasan ............. 379/210.01 |
| 5,197,096 | A | * | 3/1993 | Sakuma et al. ......... 379/207.13 |
| 5,329,578 | A | * | 7/1994 | Brennan et al. ........ 379/211.03 |
| 5,651,058 | A |   | 7/1997 | Hackett-Jones et al. |
| 5,901,211 | A | * | 5/1999 | Dean et al. ............ 379/211.02 |

FOREIGN PATENT DOCUMENTS

| EP | 93309759.4 | 7/1994 |
| GB | 2284519    | 6/1995 |
| GB | 2302238    | 1/1997 |

* cited by examiner

Primary Examiner—Ahmad F. Matar
Assistant Examiner—Hector Agdeppa
(74) Attorney, Agent, or Firm—Jones Day

(57) ABSTRACT

The present invention provides a system, implemented within a private branch exchange (PBX) telephone system, which cancels or modifies a PBX feature for a telecommunication endpoint, based on activity associated with the telecommunication endpoint. The system comprises a feature/application module for executing the PBX feature. The system also comprises a line monitor for monitoring the activity associated with the telecommunication endpoint and can cancel or modify execution of the PBX feature for the telecommunication endpoint based on activity sensed by the line monitor. The present invention also provides a method for implementing the system.

11 Claims, 3 Drawing Sheets

Wake Up Call Scenario

ADAPTIVE FEATURE BEHAVIOR

FIELD OF THE INVENTION

The present invention relates in general to scheduled PBX (Private Branch Exchange) features and more specifically to a system which is capable of canceling or modifying pre-scheduled PBX features based on monitoring activity on a user's phone line.

BACKGROUND OF THE INVENTION

A PBX (private branch exchange) is a telephone system within an enterprise that switches calls between enterprise users on local lines while allowing all users to share a certain number of external phone lines. The principal purpose of a PBX is to avoid the cost of requiring a line for each enterprise user to a telephone central office. The PBX is owned and operated by the enterprise rather than the telephone company (which may be a supplier or service provider, however). Originally, PBXs used analog technology to switch calls between users and the PSTN (public switch telephone network). More recently, digital technology has been used to implement PBX functionality (digital signals are converted to analog for outside calls on the local loop).

Modern day digital PBXs provide may enhanced features, including scheduled events such as wakeup calls or call forwarding. By scheduling a telephony event, such as a wakeup call or automatic call forwarding, the user does not have to worry about over-sleeping or being disturbed during certain hours, as but two examples. However, when a user is using his or her phone, or has used the phone during execution of the prescheduled event or feature etc., the prescheduled event or feature may no longer be appropriate. For example, in a hotel/motel wake up call system, it may not make sense for a wakeup call to be sent to a user 10 minutes after the individual has just answered a different call, made a new call, or gone off-hook for some other reason (prior to the scheduled wakeup call). It would be advantageous if the behaviour of the wakeup call feature could be adaptable based on the activity of the user's phone within a configurable time frame.

In previous applications, canceling of an operator or attendant invoked feature typically occurs from a central administrative position (i.e. Attendant or operator console) either through a feature key selection or command invocation from a PC or a central console.

SUMMARY OF THE INVENTION

It is an aspect of the present invention to provide a system which allows phone features, within a PBX environment, to be automatically modified based on monitoring activity on a user's phone line.

It is another aspect of the present invention to allow this modification to be based on the activity of a user's phone line within a configurable time frame.

Other aspects of the present invention are as follows:

A system, implemented within a private branch exchange (PBX) telephone system, which cancels or modifies a PBX feature for a telecommunication endpoint, based on activity associated with said telecommunication endpoint comprising:

a feature/application module for executing said PBX feature;

line monitoring means for monitoring said activity associated with said telecommunication endpoint;

modifying means for canceling or modifying execution of said PBX feature for said telecommunication endpoint based on activity sensed by said line monitoring means.

A method of canceling or modifying execution of a PBX feature for a telecommunication endpoint, based on monitoring activity associated with said telecommunication endpoint comprising the steps of:

a) monitoring activity associated with said telecommunication endpoint;

b) relaying said activity to a feature/application module; and c) canceling or modifying execution of said PBX feature when activity on said telecommunication endpoint is sensed.

GENERAL DESCRIPTION OF THE DRAWINGS

An embodiment of the present invention will now be described more fully with reference to the accompanying drawings in which.

DETAILED DESCRIPTION OF THE PREFERRED EMBODIMENTS

Figure 1:
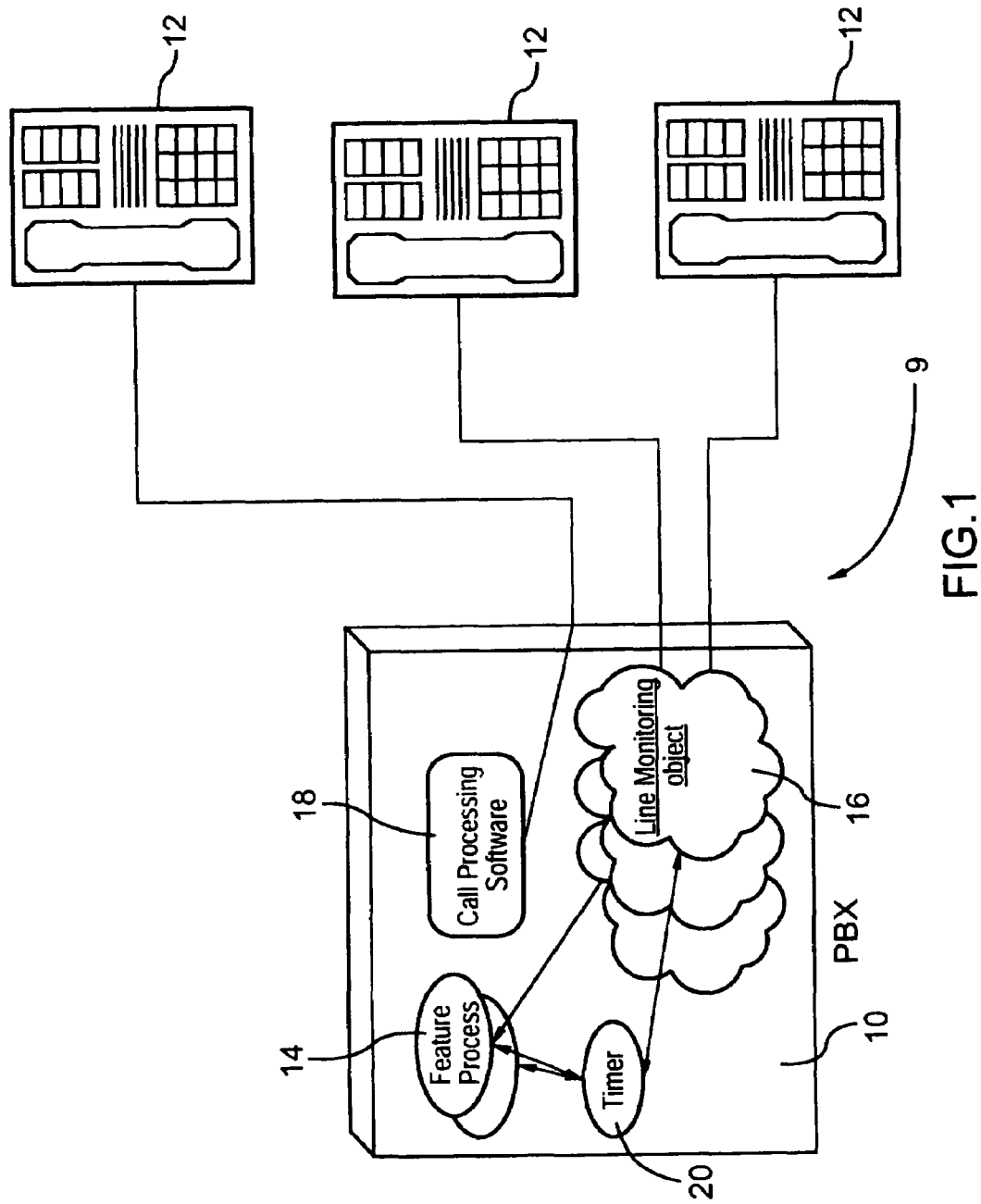
FIG. 1 is a schematic representation of a PBX telephone system of the present invention.

Turning to FIG. 1, a schematic representation of a PBX telephone system is provided incorporating the system of the present invention. A telephony enterprise 9 is shown comprising a PBX 10 connected to telecommunication endpoints 12 to provide communication capabilities to users connected to the PBX 10 (as described above). The PBX 10 comprises at least one feature/application module 14; line monitoring object 16, call processing software 18 and a timer 20. It will be understood that although only one feature/application module is described, several features are typically incorporated within a single PBX. The limitation as to how many features are available is related to the capabilities of the PBX 10. The call processing software 18 is used to make calls to/from an endpoint 12 in the enterprise 9. The calls may be connected to an external source (a telecommunication endpoint outside the enterprise 9) or an internal source (telecommunication endpoint within the enterprise 9). In FIG. 1, the telecommunication endpoint 12 is shown as a telephone. The telephone may be either a POTS phone, a digital set, a PC phone, a cellular or wireless phone, a pager, a LAN phone etc . . .

The feature/application module 14 is responsible for executing a feature in the PBX 10 with support from the call processing software 18. Examples of features include: call forwarding, reminder, wakeup call, Do Not Disturb, etc. The line monitoring object 16 is responsible for monitoring the line activity with respect to the telecommunication endpoint 12 and reporting the line activity status or state of the telecommunication endpoint line to the feature/application module 14. This can be done through a proprietary monitoring capability or through the use of a TAPI monitoring feature as is well known in the art. It should be noted, however, that line monitoring objects can monitor more than one telecommunication endpoint 12 at a time by creating individual monitoring objects for each endpoint 12. The requirements of the line monitoring objects are adapted to the specification of the PBX operator. The timer 20 is used for features which can be scheduled (e.g. reminders and wake up calls) and is also used to schedule the line monitoring objects 18 (as described below).

In prior art systems, operation of scheduled features are activated when the timer 20 reaches a predetermined value and proceeds to send a message (via a timer process) to the feature/application module 14. The feature/application module 14 then proceeds to send appropriate information to the call processing software 18 to make calls to the proper telecommunication endpoints 12, as required.

One example of a scheduled event or feature is the wakeup call feature often provided in telephone enterprises for hotels. Firstly, the user (or room occupant) makes a request to a hotel telephone operator for a wakeup call at a certain time. The hotel telephone operator programs the wakeup call into the PBX by entering the user's extension or directory number and the desired wakeup time. At the desired wakeup time, the timer 20 causes the PBX call processing software 18 to make a telephone call to the user's extension number. When the user goes off-hook, the PBX plays a wakeup call audio message (e.g. wave file, MOH or some other prerecorded message) to the user. If the user does not answer the phone, then the wakeup call is either cancelled or rescheduled for some time later.

According to an aspect of the present invention, scheduled features may be pre-programmed to behave in certain ways depending on a number of options. When a feature is set up, an operator or user setting up the feature is prompted (either on a phone display or PC) with the options available depending on the state of the telecommunication endpoint 12. It will be understood that the state of the telecommunication endpoint is related to the line status of the telecommunication endpoint 12 (i.e. on-hook, off-hook, recently off-hook etc.) One option is chosen per state so that depending on the state of the endpoint, a different behaviour results. Also, a line monitoring time is programmed (i.e. a time window, in minutes, within which monitoring to report the state of the telecommunication endpoint 12 should occur prior to the scheduled time of the feature). The time window is chosen on a feature-by-feature basis and can be applied to the whole system (all users) or only to selected users. Feature processes subscribe to events on their associated line(s) through the line monitoring objects 16. At the chosen line monitoring time, the line monitoring objects 16 for the associated lines start monitoring their lines for activity (e.g. state changes). It will be understood that although multiple line monitoring objects 16 and multiple associated lines have been disclosed, one line monitoring object 16 may be capable of monitoring any number of lines. Any activity on the line is sensed by the line monitoring object and the line monitoring object sends messages to inform the feature/application module of the line status. The feature/application module then performs the appropriate behaviour programmed above if activity is sensed on the line and makes no changes if no activity is sensed on the line.

Figure 2:
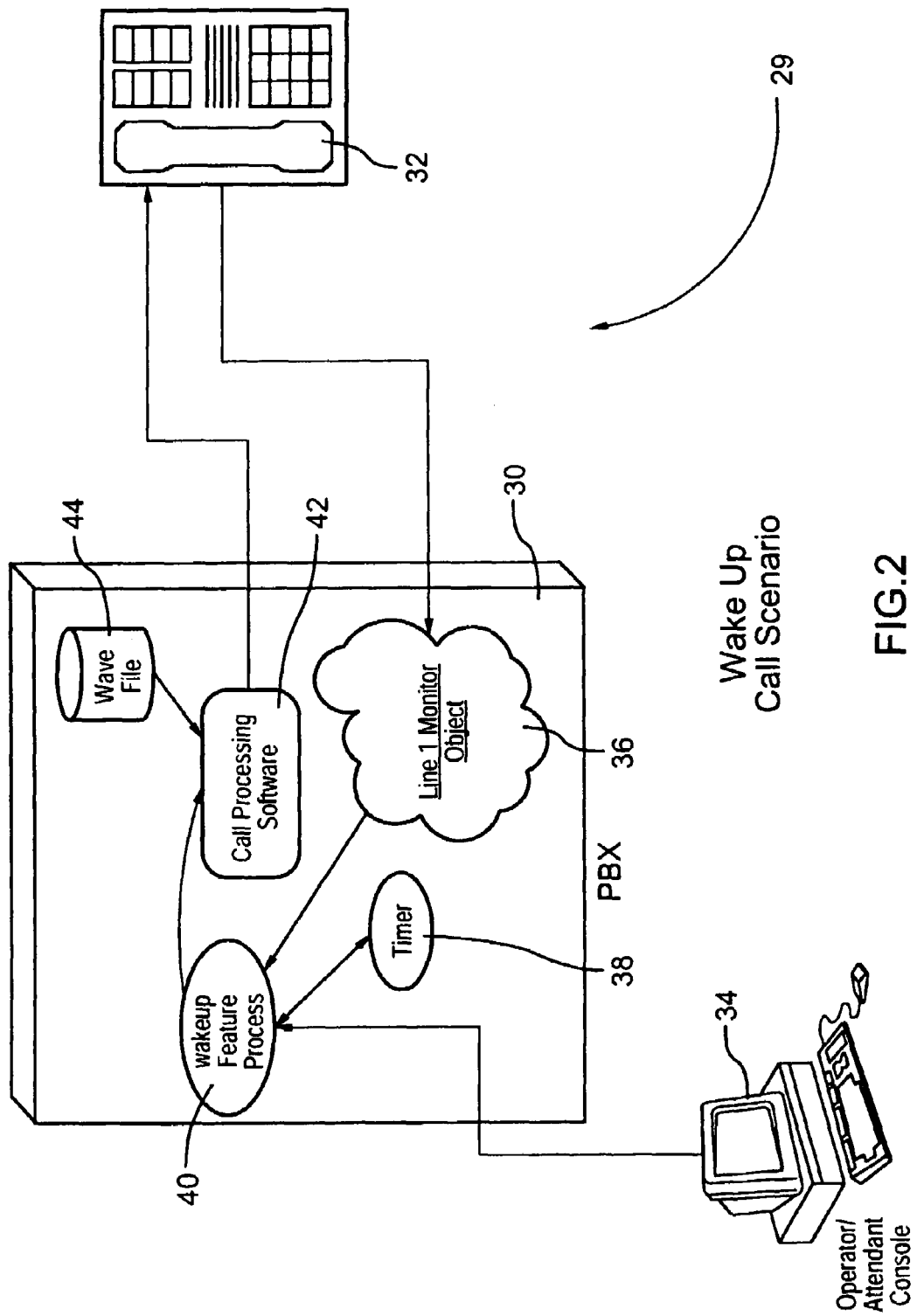
FIG. 2 is a schematic representation of a first embodiment of the present invention.

In a preferred embodiment of the present invention, a PBX system 29 is implemented in a hotel/motel environment comprising PBX 30 as illustrated in FIG. 2. In the present example, the feature discussed is a wakeup call feature. Firstly, a hotel operator programs a behaviour modification of the wakeup call feature for the whole system (all of the telecommunication endpoints 32) or by individual telecommunication endpoints 32. The hotel operator has various choices to select from. These choices include canceling the wakeup call, rescheduling the wakeup call for as soon as a telecommunication endpoint 32 goes back to idle (this could make the wakeup call earlier or later than originally programmed depending on when the user goes back on hook) or making no modifications to the behaviour if activity is sensed on the line. In the present example, the telecommunication endpoint 32 is assumed to be a telephone but may be another telecommunication endpoint such as a beeper. The programming is performed at an operator/attendant console 34. Next, the hotel operator programs a wakeup behaviour modification time for the whole system or specific rooms into the operator/attendant console 34. The wakeup behavior time is a predetermined time window in which a line monitoring object 36 is invoked prior to execution of a prescheduled feature. It will be understood by one skilled in the art that although only one telecommunication endpoint 32 and one line monitoring object 36 are shown, use of multiple endpoints and multiple line monitoring objects is possible. Since operation of the line monitoring objects and the endpoints are consistent, the system is described with respect to only one line monitoring object 36 and one telecommunication endpoint 32. The line monitoring object 36 monitors the activity of an associated telecommunication endpoint 32. Although the programming of the modification time has been described, this step may occur at any time prior to a desired wakeup time minus the wakeup behaviour modification time. For instance, if a wakeup call is requested at 7:45 am and the wakeup behaviour modification time is 30 minutes, the line monitoring object 36 begins to monitor the activity of the associated telecommunication endpoint at 7:15 am.

When a user requests a wakeup call to the user's telecommunication endpoint 32, the hotel operator proceeds to program the wakeup call into the PBX by entering a desired wakeup time and a telecommunication endpoint identification (or directory number) of the user through console 34.

When a timer 38 in the PBX 30 senses a monitoring time value (the desired wakeup time minus the wakeup behavior modification time), a signal is sent to the line monitoring object 36 to start monitoring the state of the line associated with the user's telecommunication endpoint 32. The line monitoring object 36 provides continuous updates regarding the status of activity on the line to a feature/application module (shown as a wakeup feature process) 40. If the state of the line is busy or changes to busy before the desired wakeup time, the line monitoring object 36 sends a message to a feature/application module (shown as a wakeup feature process) 40 regarding the activity on the line. Depending on which behaviour is chosen (as preprogrammed above), the feature/application module 40 proceeds to follow the instructions. For instance, if the chosen new behaviour, based on activity on the line, is CANCEL, the wakeup call is cancelled. If the chosen new behaviour is RESCHEDULE, the feature/application module 40 waits for an idle status signal from the PBX line monitoring object 36 and then when the signal is received, informs PBX call processing software 42 to make the wakeup call to the telecommunication endpoint 32 and to send a wakeup message. Otherwise, if the line status remains idle, or no activity is sensed, before the desired wakeup time, the PBX call processing software 42 proceeds to make the wakeup call to the telecommunication endpoint 32 and sends the wakeup message. As indicated above, the wakeup message is usually a wakeup call audio stream 44 (e.g. wave file, MOH (message on hold) or some other prerecorded message, such as a special message which is configurable when the behavior modification is programmed, to be sent with a rescheduled wakeup call).

Figure 3:
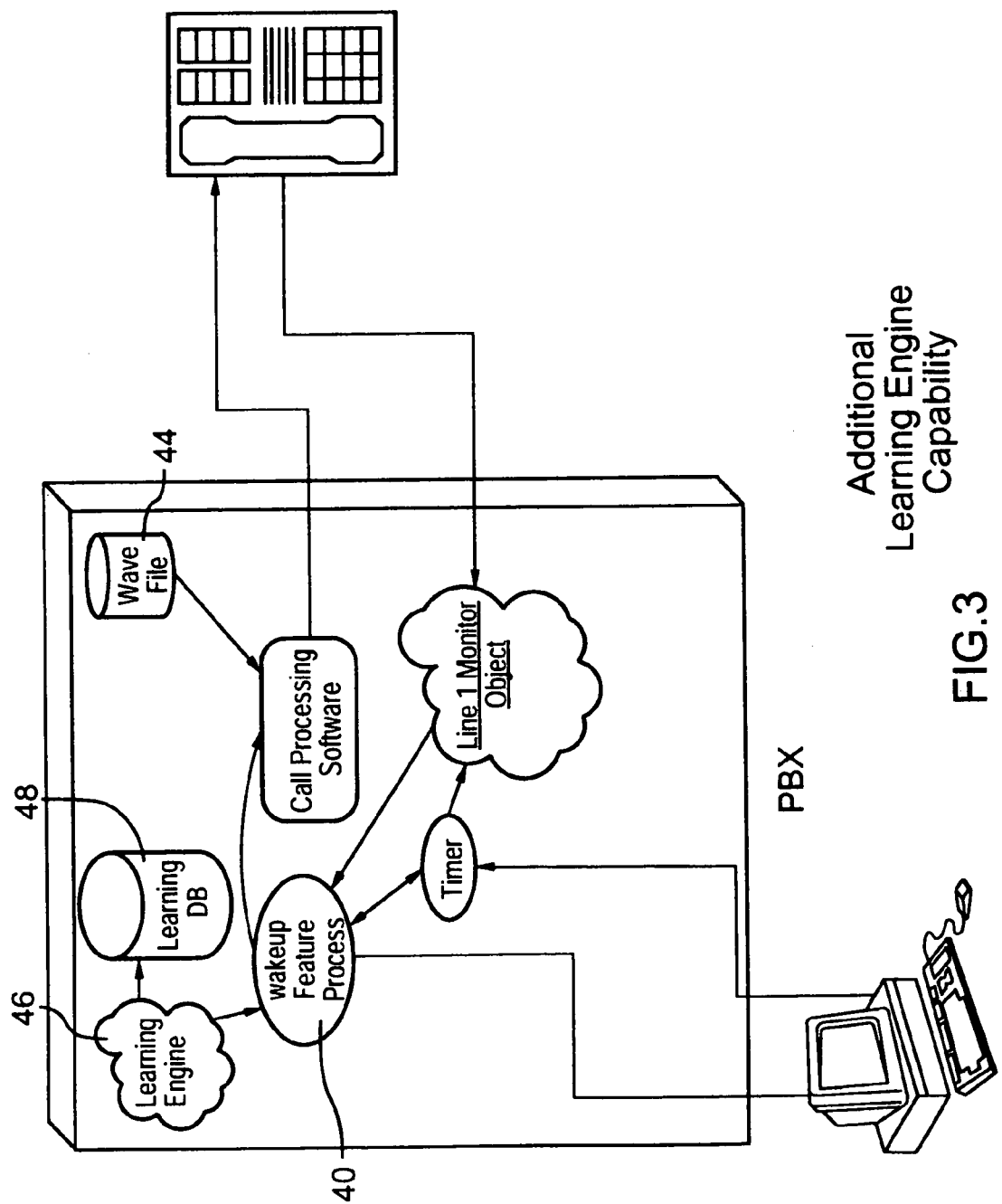
FIG. 3 is a schematic representation of a second embodiment of the present invention.

In a second embodiment, a learning engine 46 may be incorporated as an extension to the present invention. The learning engine 46 monitors the feature/application module 40 and makes suggestions for automatic changes based on a history of previously programmed behaviors. This second embodiment is shown in FIG. 3.

In this embodiment, the learning engine 46 registers with the feature/application module 40 to receive notification of feature behaviour changes on each telecommunication endpoint 32. The learning engine 46 stores this feature behaviour in a learning database 48. Therefore, the history of behaviour changes for each telecommunication endpoint 32 is stored. When the feature/application module 40 is programmed in the future for a particular telecommunication endpoint 32, the learning engine 46 queries the database 48 for the most recent and/or common selections for that feature with respect to the particular telecommunication endpoint 32. The hotel operator is then provided with this information in the form of a suggestion, so that the hotel operator can quickly select the modified behaviour from the learned selection and therefore not have to worry about querying the user about the requested behavior modification in case activity is sensed on the line by the line monitoring object 36.

By using the "Dial By Name" capabilities in most PBX's, the learning engine 46 can be further expanded to keep track of behaviour modification selections by user name rather than simply by telecommunication endpoint. When the hotel operator programs the behavior modification, the system can access a user list and map users to their historical profile stored in the learning engine 46 and make even more intelligent suggestions based on individual user history.

Although a preferred embodiment of the present invention has been described, those skilled in the art will appreciate that variations and modifications can be made without departing from the sphere and scope thereof as defined by the appended claims.

What is claimed is:

1. A system, implemented within a private branch exchange (PBX) telephone system, which, prior to a predetermined execution time of a PBX feature for a telecommunication endpoint, modifies a behaviour of said PBX feature, based on activity associated with said telecommunication endpoint, comprising:
   a feature/application module for executing said PBX feature;
   line monitoring means for monitoring said activity associated with said telecommunication endpoint;
   a timer to signal said line monitoring means to commence monitoring for a configurable time frame prior to said predetermined execution time; and
   modifying means for modifying said behaviour of said PBX feature prior to said predetermined execution time based on activity sensed by said line monitoring means during said time frame.

2. The system of claim 1 further comprising call processing means for connecting calls to said telecommunication endpoint from a second telecommunication endpoint.

3. The system of claim 2 wherein said modifying of said behaviour of said PBX feature is pre-programmed.

4. The system of claim 1 wherein said configurable time frame is pre-programmed.

5. The system of claim 1 wherein said timer also signals said feature/application module to execute said PBX feature.

6. The system of claim 1 wherein said modifying means is incorporated with said feature/application module.

7. The system of claim 1 wherein said line monitoring means is at least one line monitoring object.

8. The system of claim 1 further comprising:
   a learning engine for monitoring said feature/application module and for providing information relating to history of said telecommunication endpoint and said PBX feature; and
   a database for storing said information.

9. The system of claim 1 further comprising means for associating said PBX feature with a user.

10. A method of modifying a behaviour of a prescheduled PBX feature for a telecommunication endpoint prior to a predetermined execution time of said PBX feature, based on monitoring activity associated with said telecommunication endpoint comprising the steps of:
    a) prior to execution of said prescheduled feature, receiving a signal to commence monitoring activity associated with said telecommunication end point;
    b) in response to said signal, monitoring said activity associated with said telecommunication endpoint for a configurable time frame prior to said predetermined execution time;
    c) relaying said activity to a feature/application module; and
    d) modifying said behaviour of said PBX feature prior to said predetermined execution time when, during said time frame, activity on said telecommunication endpoint is sensed.

11. The method of claim 10 wherein said method further comprises the step of
    e) executing said prescheduled PBX feature.

* * * * *